June 22, 1954  R. L. WILLE  2,681,647
CONTROL OF INTERNAL-COMBUSTION ENGINES
Filed Oct. 7, 1949  2 Sheets-Sheet 1
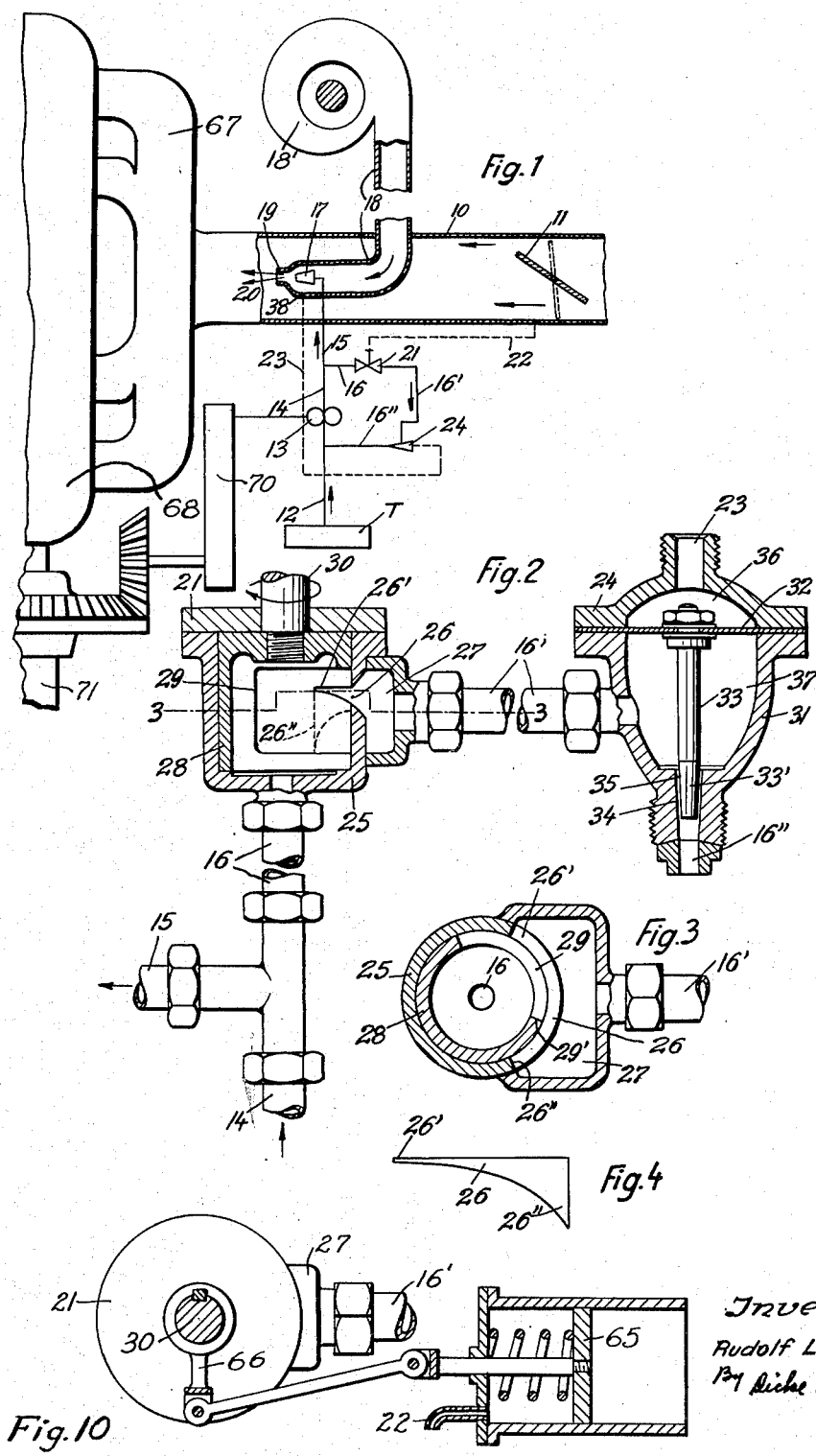
Inventor
Rudolf L. Wille
By Dike and Padlon
Attorneys June 22, 1954          R. L. WILLE          2,681,647
CONTROL OF INTERNAL-COMBUSTION ENGINES
Filed Oct. 7, 1949                          2 Sheets-Sheet 2
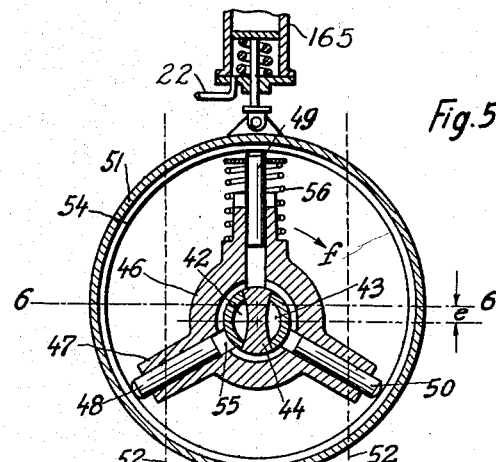
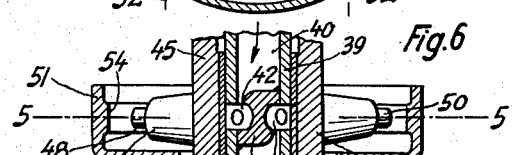
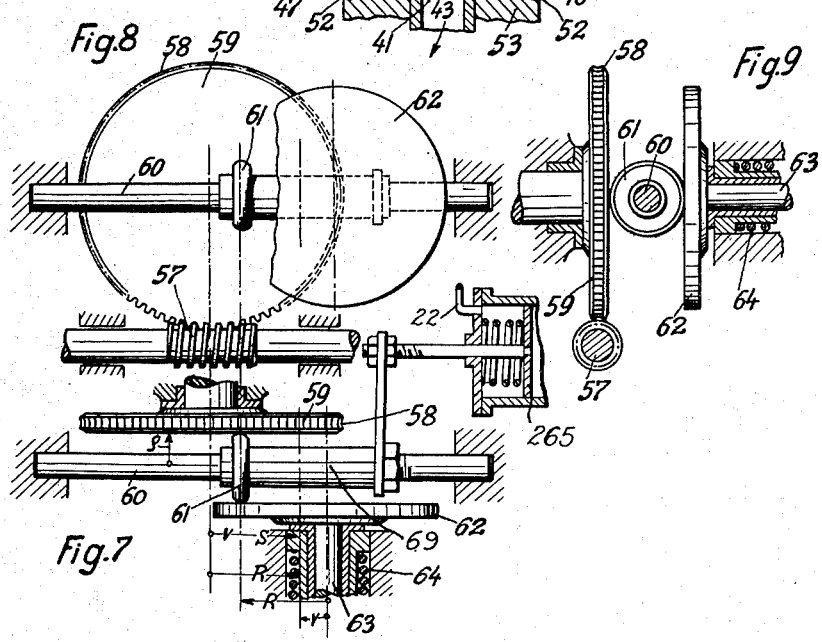
Inventor
Rudolf L. Wille
By Dicke and Padlon
Attorneys

UNITED STATES PATENT OFFICE 2,681,647

CONTROL OF INTERNAL-COMBUSTION ENGINES

Rudolf L. Wille, Berlin-Charlottenburg, Germany

Application October 7, 1949, Serial No. 120,062

27 Claims. (Cl. 123—131)

This invention relates to the control of internal combustion engines, more specific to a method of control and arrangement of control embodying said method. The operating condition of an internal combustion engine, e. g. an automobile engine, which is measured by R. P. M. and output, is determined by the external load and the respective position of a control means, for instance a throttle. In this case the amount of air drawn by the engine is, generally speaking, proportional to the number of revolutions, provided the relative position of the control means remains unchanged, and can besides be altered by regulating the control means. In a like manner it is necessary to control the fuel delivered, i. e., in proportion to the amount of air drawn in order to obtain a constant ratio of mixture at lowest fuel consumption and to produce in the cylinder the most favorable combustion conditions.

The present-day carburetors almost exclusively used for automobile gasoline engines seek to achieve this object generally by producing a suction proportional to the air flow by a reduced cross-sectional area and to use this suction for drawing the fuel required. Carburetors of this type have, even in their present design, a number of drawbacks which have unfavorable effects on engine efficiency and make it advisable to abandon this operating principle.

Contrary to this type of carburetors the invention refers mainly to engines in which the fuel is atomized by compressed air in a nozzle provided in the air intake pipe, preferably in such a way that the atomizing air delivered under pressure is substantially accelerated on its way from the place where the fuel enters the air pipe to the nozzle orifice. Since in this case the amount of fuel drawn by the air is not controlled by the air itself, the invention provides for engines of this type a separate control of the injected fuel in such a manner that the regulating action is on the one hand controlled by the speed, and on the other by the load or some other control means. To give but an example, it is necessary in this case to regulate, in automobile engines, the fuel quantity according to the operating R. P. M. of the engine (approx. 400 to 4000 R. P. M.), i. e., within a range of 1:10, and on top of that in a ratio of 1:4 depending on changes in load at constant speed, which results in a total control ratio of 1:40.

As regards speed-responsive fuel control, it is possible to design, in general, a regulating means providing a constant quantity per cycle or revolution similar to the conditions prevailing in carburetors, in which, provided other conditions are equal, the quantity of air drawn is, in the first approximation, proportional to the speed.

For the other part of fuel control, i. e. the load-responsive control, the conditions are more complicated, however. If the speed remains constant, e. g. in ordinary gasoline engines, higher loads require increased quantities of air, that is the butterfly valve should be opened, and vice versa a reduced load calls for reduction of the air delivered. The necessary control can thus be achieved by making use of the suction on the engine side of the throttle in such a way that the controlling means reduces, with increasing suction on the engine side of the throttle the fuel delivery in accordance with the decreasing quantities of air. A closer analysis reveals that in this case—to give but an example—a suction increasing along a straight line characteristic and available at a place on the engine side of the throttle will result in a quantity of air drawn, and thus in fuel quantity proportional to the latter, which is reduced approximately in accordance with the square of the respective suction, in the beginning at a somewhat higher and later lower rate.

In view of the wide range of about 1:40 or even greater, it is hardly possible to control this total range of speed and load simply by throttling the fuel delivery, even when the fuel is injected, because it would be necessary, due to the pressure varying with the square of the speed and thus of the fuel quantity, to vary the resistance value between 1 and 1600 times the velocity head, in order to achieve a control of fuel varying from 1 to 40. For that reason the invention provides, as an additional measure, a control of the fuel quantity by a pump delivering quantities in accordance with the engine speed which quantity available for injection for every cycle of the engine is additionally regulated by a control means responsive to the load or the air quantity drawn. When employing a throttle in the air intake line it is again possible to use the pressure or suction respectively on the engine side of the throttle for the controlling action. In this case the controlling device has to vary the fuel quantity only in the ratio of the changing load, i. e., in a ratio of 1:4, while the speed-responsive control is automatically assumed by the pump whose speed is equal or in a fixed relation to the engine speed; no additional control of the pump speed is provided, which is however possible.

Since the amount of fuel delivered should be independent of the back pressure and vary with the speed of revolution, the pump used is as a rule of the piston-type or a rotary pump, e. g. a gear pump, allowing of delivering fuel in very small quantities and insuring a practically continuous supply particularly when fuel is injected into the air charge before it enters the cylinder or cylinders respectively. For gear pumps it will in general also be necessary to reduce the engine speed (up to 4000 R. P. M.) at the ratio of about 6:1, since the minimum delivery for gear pumps is at present in actual operation approx. 0.4 cm.$^3$ per revolution, while the fuel consumption of a small size automobile engine (of about 38 H. P.) is only roughly 0.07 cm.$^3$ per revolution at full load.

The additional control regulated in accordance with load or air charge respectively can be accomplished, according to the invention, in different ways, i. e.:

(1) By a hydraulic control arrangement which divides the fuel quantity delivered by the pump per engine cycle into a useful portion for injection and a portion returning to the fuel tank directly or in some other way, preferably with the help of throttling arrangements altering the friction heads in the fuel lines.

(2) By a control arrangement which, at a constant speed ratio between engine and pump, varies the fuel quantity delivered per cycle or revolution respectively by a variation of the piston displacement of the pump, particularly by varying the stroke of the pump.

(3) By a control arrangement varying the speed ratio between engine and pump, the variation being, in whole or in part, preferably done by stepless speed regulation. The latter can be accomplished hydraulically (by means of hydraulic drives, rotary pump, etc.) or, preferably, by means of friction-type gearing or the like.

The invention is, however, not confined to the aforementioned embodiments. Furthermore these examples can be combined in any suitable manner, although it will, for simplicity sake, be advisable as a rule to employ one of these methods of fuel control. Also, the various control arrangements might be applied, if feasible, in other types of injection-type engines as mentioned above, although it is especially advantageous and appropriate to use these arrangements for engines with fuel atomization.

Additional details of the invention can be seen from the following description in connection with the drawings:

Fig. 1 a diagram of the hydraulic control according to the invention.

Fig. 2 the hydraulic control arrangement at an enlarged scale.

Fig. 3 top view of section on line 3—3 of Fig. 2.

Fig. 4 control port developed.

Fig. 5 top view of rotary pump used for delivery and control shown in section on line 5—5 of Fig. 6.

Fig. 6 section on line 6—6 of Fig. 4.

Fig. 7 friction-type gearing used for driving the pump and employed as additional control means.

Fig. 8 front view of this gearing.

Fig. 9 fragmentary section of the side view of this gearing.

Fig. 10 a plan view of the control mechanism shown in Fig. 2 and a sectional view of a suction-operated piston for adjusting said mechanism.

(1) *Hydraulic control (Figs. 1–4)*

The intake manifold 67 of an automobile engine 68 communicates with an intake pipe 10. In the application according to the diagram 1, a butterfly valve 11 is provided at a suitable place in the air intake line 10 which can be either controlled at will or regulated in accordance with some other function, the air intake pipe being connected to the outside air or to a charging unit. The fuel is delivered from a tank T through a supply line 12 by a gear pump 13 driven by the internal combustion engine at a constant reduction ratio (e. g. 6:1) into a line 14 which forks into an injection line 15 and a return line 16. The former leads to fuel nozzle 17 which enters a compressed air line 18 connected with a suitable source of compressed air such as diagrammatically indicated as a rotary compressor 18' in such a way that the compressed air adapted to atomize the fuel is considerably accelerated at the place of the fuel inlet, and atomizes the fuel as a result of this acceleration, and that, at the same time, fine particles enter the suction pipe at the air nozzle surface 19 in the direction to the cylinder as shown by the arrows 20. The line 16 of 16'—16'' respectively returns to pump 13 through a throttle 21 which is suitably controlled by the suction on the engine side of the butterfly valve 11—as shown for example by line 22—and through a throttle arrangement 24 which is exposed to the pressure of the compressed air in line 18 on the one hand (as indicated by 23) and to the pressure of the by-passed fuel on the other.

It has been mentioned hereinabove that the gear pump 13 is driven by the internal combustion engine 68 at a constant reduction ratio. In Fig. 1 a shaft 71 of the engine, which may be either the crank shaft or the cam shaft, is shown as being connected with the pump 13 by a suitable train of motion transmitting elements such as gears and shafts or the like. Included in this train is a reduction transmission diagrammatically indicated at 70.

Figs. 2, 3 and 10 show the control arrangement 21 and the throttle mechanism 24 at an enlarged scale by way of example. The control arrangement consists of case 25 with control port 26 whose cross-sectional area increases according to a certain characteristic, for instance constantly, and enters compartment 27, to which the return line 16' is connected. In housing 25, a rotary slide 28 with opening 29 is seated and connected to shaft 30. This shaft is for example rotated by a spring-loaded piston 65, which is controlled by the suction produced on the engine side of throttle 11, through an arm 66, gear or the like. When the engine runs at high load (in other words, when the throttle 11 is practically open and suction in line 10 is low) the rotary slide 28 after rotating in counter-clockwise direction is, according to Fig. 3, in such a position that the edge 29' of opening 29 is just clearing the narrow end of port 26. When the load decreases (i. e. when throttle 11 is being closed and suction is increasing in line 10), the rotary slide 28 is rotated in clockwise direction until, at no load, the entire control port 26 is open by the respective position of opening 29, i. e., the control edge 29' coincides with the rear edge of the port end 26''. Figs. 2 and 3 show an intermediate position of control slide 28.

Instead of providing a throttle control in the return line, such control could, theoretically, be introduced in the feed line 15 or in both lines. However, since the fuel quantities injected and the cross section of the nozzle orifice (approx.

0.5 mm.²) are small, it is understood that the arrangement of the throttle control in the feed pipe will encounter a great many constructional difficulties, as the throttle cross section would be correspondingly small. In most cases it will therefore be advisable to accommodate a resistance control arrangement in the return line as shown in the drawing, which might be combined with a simultaneous resistance control in the feed line. The latter method might be advantageous for larger engines or for greater control ranges, if for instance cross-sectional changes of from 1:100 must be controlled.

The constant fuel quantity delivered per stroke of engine divides, in accordance with resistance factors, into streams in the feed line 15 (hereinafter designated by factor I) and the return line 16 (hereinafter designated by factor II). With Q designating the total fuel quantity delivered by the pump, $x_I$ and $x_{II}$ the partial fuel quantities in the two lines, and $\varphi_I$ and $\varphi_{II}$ the resistance factors, the following equations can be set up:

$$Q = x_I + x_{II}$$

$$\frac{x_{II}}{x_I} = \sqrt{\frac{\varphi_I}{\varphi_{II}}} = \alpha$$

or $$\epsilon_0 = \frac{x_I}{Q} = \frac{x_I}{x_I + x_{II}} = \frac{1}{1+\alpha} = \frac{\sqrt{\varphi_{II}}}{\sqrt{\varphi_{II}} + \sqrt{\varphi_I}}$$

According to the last equation it follows that the ratio $\epsilon_0$ between the quantity injected and the total quantity delivered does not vary with the speed, but is solely a function of the ratio of the two resistances in line I and II. Thus if the resistance factors and thus the friction heads are constant in both lines, it follows, that the fuel injected per unit of time is proportional to the speed of the pump or of the engine respectively as it is required. By changing the resistance factors $\varphi_{II}$ of the return line it is possible to alter the ratio $\alpha$ or $\epsilon_0$ respectively according to the above equations, e. g., in such a way that equal movements of the control arrangement changes the fuel injected by equal amounts. To this end it is necessary that the control curve (thus the control port 26 in Figs. 2 to 4) has a corresponding shape. For a practically linear control curve the shape of the control port will be such that the increase on the narrow end is at first fairly small and becomes comparatively great only during the last part (see Fig. 4). From the foregoing it will be appreciated that the combined effect of simultaneous changes of both (1) the degree of vacuum prevailing on the engine side of the throttle 11, i. e. in the intake manifold 67, and (2) the speed of the engine, will be that $x_I$ (fuel flow injected) will be proportional to the product of the engine speed and of the pressure of the air delivered to the engine. The above equations are only valid, however, when the back pressures in the two lines I and II, i. e., in the feed line I and the return line II are equal. In all other cases the relations would be far more complicated.

Without taking special measures, there will, however, be a considerable pressure drop between nozzle orifice (17) and the place where the return line enters into the feed line 12 to the pump, and that the more, the higher the speed of the engine and the higher the inside pressure in the air nozzle. The latter might exceed the critical pressure drop in relation to that pressure which exists at the inlet of the return line into the feed line of the pump, i. e. the atmospheric pressure under ordinary conditions. Thus it would be brought about that the flow of fuel to the nozzle would be superimposed by a counter-flow with negative pressure drop in the direction from the nozzle to the return line, a flow which would lower the ratio between the quantity injected and the total pump delivery $\epsilon_0 = x_I/Q$, or which would eliminate the spraying flow entirely when a certain value is exceeded and might even reverse the flow in the nozzle line, with the result that the entire fuel would pass through the return line. The true ratio between the quantity of fuel injected and the total pump delivery can theoretically be calculated with the help of a factor S which in turn is a function of the pressure drop, the friction heads in the branch lines, the total quantity Q delivered, and the cross section of the line, the equation for such calculation being $\epsilon = \epsilon_0 \cdot S$; however, under actual conditions, a control is only workable when the factor S is equal to 1, because otherwise speed has an undesirable influence. But S will not become one unless the back pressures in the two lines are equal, in other words when the pressure at the place where the return line enters the supply line of the pump is the same as that at the orifice of the injection nozzle.

In order to achieve this object at least approximately, the embodiment of the invention represented in the drawing provides an additional throttle arrangement 24, which separates section 16' from section 16'' of the return line 16. As shown in Fig. 2, this arrangement consists of a housing 31 into which a diaphragm 32 with throttling pin 33 is clamped. The tapered end 33' of the pin extends into the tapered hole 34 of the housing, forming thereby the throttling opening 35. The pressure on the one side of the diaphragm, that is in chamber 36, is that of air nozzle 18 passed on through line 23, while the compartment 37 is directly connected with the return line 16. When the diaphragm 32 can freely vibrate within the limits necessary for the control of opening 34, the needle 33 will attempt to close the throttle opening under the action of the compressed air in compartment 36 until the pressures on both sides of the diaphragm are balanced, in other words until the pressure of the returning fuel in line 16' become, due to the narrowing throttle opening, equal to the pressure of the compressed air in the air nozzle 18 at place 38 where line 23 starts (Fig. 1).

If this tap 38 is properly chosen, the pressure at this place is virtually the same as that at the orifice of injection nozzle 17 and thus the same as the pressure in feed line 15. Delivery of pump 13 is therefore done both in line 15 and line 16 against practically the same back pressure. For constructional reasons it might, in some cases, be more advisable to shift the tap 38 to the rear away from the orifice into the unconstricted portion of air line 18 where the air is not yet accelerated and has, for that reason, a somewhat higher pressure than at the orifice of the injection nozzle 17 (e. g. about 1000 mm. water gauge). Such a difference in pressure will, as a rule, only occur at higher speeds where the influence of the difference in pressure is relatively small. Thus it is possible to connect, if desired, the line 23 directly to the compressor producing the compressed air in line 18. If it is, however, desired to eliminate the influence of the difference in pressure practically to the full, it is also possible, instead of locating the tap 38 at the constricted part of air nozzle 18, to reduce the area under pressure of diaphragm 32 as seen from compartment 36, or to introduce a spring which counteracts the closing action of the throttling needle.

(2) *Control by changing the piston displacement of the pump (Figs. 5 and 6)*

An embodiment of this type of control is shown in the Figs. 5 and 6. A rotary pump serves in this case to simultaneously deliver and control the fuel quantity. A stationary shaft carries the rotating pump housing 46 which receives, e. g., its motion through part 45. The shaft serves at the same time as feed or suction line 40 respectively as well as pressure line 41 for the fuel. Its two parts are welded together by means of blade-type wall 44 which separates the suction side 42 from the pressure side 43. The bores in the housing extension 47 carry the plungers 48, 49, and 50 which can reciprocate in a radial direction. The motion of the plungers is controlled by the eccentric ring 51. The latter is slidably arranged on guide 53 fixed to the shaft and can be moved on guide ways 52 in a direction at right angles to shaft 39 in such a way that the variable eccentricity $e$ can be utilized for controlling the stroke of the three plungers. As stated hereinabove in the 5th paragraph of the specification the load-responsive control of the engine is achieved by making use of the suction on the engine side of the throttle in such a way that the controlling means reduces, with increasing suction on the engine side of the throttle, the fuel delivery in accordance with decreasing quantities of air, such controlling means being constituted in the first described embodiment by the piston 65 illustrated in Fig. 10. In Fig. 5 a similar piston 165 is diagrammatically indicated, such piston being controlled by the partial vacuum existing in the intake line 10 between the engine 68 and the butterfly-valve 11 in exactly the same manner as described with reference to piston 65, the line 22 connecting the cylinder of piston 165 with the pipe 10. The plungers 48, 49, and 50 slide on a ring-shaped sliding surface 54 of eccentric ring 51. In doing so, they carry out—when the pump rotor rotates in the direction of arrow $f$—a suction stroke towards the outside away from the shaft from their lowest (in Fig. 5) to their uppermost position—amounting to twice the eccentricity ($=2e$), and a pressure stroke of the same magnitude towards the shaft when the pump continues rotating to the bottom position. The pump compartment 55 is in connection with the suction line 40 or the suction compartment 42 respectively during the time the plunger in question travels in outward direction and is connected to the pressure line 41 or the pressure compartment 43 respectively during the inward travel of that plunger. Suitable springs may be provided to press the plungers against the eccentric ring during the suction stroke as indicated at 56.

As mentioned above, the plunger displacement is determined by the eccentricity of the eccentric ring 51 in relation to shaft 39 and can be controlled by changing the amount of eccentricity. The construction of the pump can be such that it delivers only the fuel quantity required for the injection or such that it delivers in addition an excessive quantity of fuel which, similar to the first example, may be branched off by a suitable throttling arrangement from the fuel injected. In this case, however, it is not necessary to separately control the resistances (as shown in control arrangement 21) as had to be done in the first embodiment described, or only in so far as an especially accurate metering of the fuel quantities injected is required. As a rule the action of the rotary pump can be confined to the delivery of the fuel injected, if necessary with the pump running at reduced speed as compared with engine speed. This holds particularly true when the pump is used for larger engines and thus for larger fuel quantities. The difficulties in the design for achieving an accurate metering are then reduced and in addition a more expensive construction is justified.

(3) *Pump control by stepless drive (Figs. 7–9)*

For pump speed control the transmission 70 inserted in the driving connection indicated diagrammatically in Fig. 1 between crank shaft or cam shaft and pump 13 may be of the continuously variable mechanical or hydraulic type. However, the use of hydraulic drives is rarely justified because of the great expense connected with it. The variation of the ratio may cover a range of 1:10 for instance.

The friction-type gearing is especially adapted for this purpose because the power transmitted is rather small (around $\frac{1}{1000}$ H. P.). In this case it is possible to avoid the drawbacks of the friction drive which occur particularly in high-power transmission (high pressures on the contact surfaces and bearing load, slip of friction wheels, large wheel diameters, and the like). In addition friction-type gearing is especially simple in construction. The total pressures at the contact area are approximately 5 kg. in automobiles as calculation shows. Furthermore, by using automatic adjustment and a special arrangement the influence of friction surface wear on the control characteristics or the slip can be made negligeably small in such small-power transmissions.

However, the high range of speed reduction (from 1:1 to 10:1) calls for a special construction lest the speed change transmission should become rather bulky. Such a bulky construction would for instance result when a pair of friction wheels consisting of a friction roll and a disk wheel is provided. In addition the bending stresses occurring in the shaft would be comparatively unfavorable and the forces necessary for control rather high.

The conditions are especially favorable when a gearing is used in which the friction roller is arranged between two friction or disk-type wheels. Such a gearing construction is represented diagrammatically in Figs. 7–9 by way of example. A worm 57, for instance, directly driven by the cam shaft of the internal combustion engine, meshes with the teeth 58 of the friction wheel 59. The latter engages, through friction roller 61 mounted on shaft 60 and arranged so that it can travel through the control motions, the second disk wheel 62 which in turn drives the driving shaft 63 of the fuel pump. A spring 64 produces the necessary contact pressure between disk wheel 62 and friction roller 61 and if necessary between the latter and disk wheel 59. It is, however, possible to employ a separate spring for the second disk wheel. As stated hereinabove the friction roller 61 is arranged so that it can travel through the control motions. The control motions are produced, as stated in the 5th paragraph of the specification, in the same manner as in the two embodiments described hereinabove, more particularly by a piston, such as 65 or 165. More specifically, the roller 61 is journalled on a sleeve 69 and mounted for common axial displacement with such sleeve. The sleeve 69 is movable by a piston 265 which is similar to the pistons 65 and 165, having the same function as the same and, therefore, need not be described in detail, only so much of the structure being indicated in Fig. 7 as is required for an understanding of the mode in which the roller 61 will be radially set depending on the partial vacuum existing in the intake pipe 10 between the engine 68 and the throttle 11 and communicated by line 22 to the cylinder accommodating the piston 265.

This construction has the advantage that the contact pressures of the disk wheel against the center friction roller are in opposition and cancel each other out, with the result that the shaft of the friction roller (61) is relieved of all bending stresses. Furthermore it is possible to reduce the diameters of the disk wheels considerably because the reduction is now accomplished in two stages. The most favorable conditions will result when the range of control is equally divided between the two disk wheels, when the smallest transmission radius $r$ as well as the largest transmission radius $R$ in the two disk wheels are equal, the difference $R-r$ being equal to $s$ and the disk wheels 59 and 62 being axially offset in such a way that the friction roller 61 in its extreme positions rolls at the same time on radius $r$ of the one disk wheel and on radius $R$ of the other. The reduction ratio in these two extreme positions is then either $r/R$ or $R/r$. In a total range of reduction from 1 to 10 the largest radius of $R$ would be determined to $R=\sqrt{10r}$ the smallest radius $r$ being about the size of the friction roller or a little smaller. The diameter of the disk wheels would then be no more than 3 to 4 times that of the friction roller while in the case of one single disk wheel the diameter of the latter would have to be 10 times that of the friction roller.

Instead of using friction drives with disk-type friction wheels it is of course possible to employ friction drives with level-type wheels or the like. Also, it is possible to provide a stepless control by purely hydraulic means with hydraulic pump and motor, by electrical means or otherwise, although such controls lack the simplicity of friction drives. If desired it is also possible to employ a step-type gearing or a gearing which is partially controlled in steps, although the most favorable quantities of fuel cannot be attained for every position when control is carried out in steps. However it is possible to combine such a control with an additional throttle regulation or the like to achieve a favorable overall control.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrations and not in a limiting sense.

I claim:

1. Method of controlling the fuel injection in internal combustion engines which comprises delivering the fuel under pressure, controlling the fuel delivered so as to make it on the one hand substantially proportional to the engine speed, and on the other hand substantially proportional to the pressure of the air delivered to the engine, and injecting the fuel charge into the air passing to the engine by means of accelerated compressed air.

2. Method of controlling the fuel injection in internal combustion engines which comprises delivering the fuel under pressure, dividing the fuel delivered into a charging quantity for injection and an excess quantity to be returned to the fuel supply, injecting the fuel charge into a stream of compressed air, discharging said stream loaded with fuel as a jet into a stream of low pressure air passing to the engine, and returning the excess fuel quantity against a back-pressure which is approximately equal to the pressure of said compressed air.

3. Method of controlling the fuel injection in internal combustion engines which comprises delivering the fuel under pressure, injecting it into the air passing to the engine, and controlling the fuel injected on the one hand so as to make it substantially proportional to the engine speed, and on the other hand substantially proportional to the pressure of the air delivered to the engine, the total fuel quantity delivered per revolution being controlled so as to be approximately proportional to the air charge delivered to the engine and the total fuel charge so controlled being injected by means of compressed air into the air stream flowing to the engine.

4. In an internal combustion engine, a fuel injection arrangement, comprising an injection device injecting the fuel charge by means of compressed air, and a feeding device adapted to deliver fuel under pressure to the injection device, a controlling device adapted to control the fuel charge delivered to the injection device on the one hand substantially proportional to the speed of revolution of the engine for a given pressure of the air charge delivered to the engine and on the other hand substantially proportional to the quantity of the air charge delivered to the engine per revolution of the engine for a given speed of revolution of the engine.

5. In an internal combustion engine, a fuel injection system as set forth by claim 4, the feeding and controlling device consisting of a fuel pump driven at engine speed, a feed line from the pressure side of the feed pump to the atomizing device, a return line from the pressure side to the suction side of the feed pump, an adjustable throttle in at least one of these two lines and a controlling device adapted to be controlled in accordance with the pressure of the air charge and adapted to regulate the adjustable throttle.

6. In an internal combustion engine, a fuel injection arrangement as set forth in claim 4, the feeding and controlling device consisting of a feed pump driven at engine speed, a feed line from the pressure side of the feed pump to the atomizing device, a return line from the pressure side to the suction side of the feed pump, an adjustable throttle in the return line, and a controlling device adapted to be controlled in accordance with the pressure of the air charge and adapted to regulate the adjustable throttle.

7. In an internal combustion engine having an intake conduit, a fuel injection arrangement comprising an injection device for injecting fuel into a stream of compressed air, a conduit conducting said stream, a nozzle at the end of said conduit adapted to issue a jet of fuel-loaded compressed air and located within said intake conduit, a fuel pump delivering the fuel under pressure, a line connecting said pump with said injection device, a return line branching off from the latter and connected to the suction side of the pump and adapted to return the fuel delivered in excess, an adjustable throttle in said return line adapted to controllably divide the fuel delivered between said first mentioned line and said return line, and a throttle device inserted in said return line between said adjustable throttle and said pump and adapted to control the pressure prevailing in said return line in such a way that said pressure is substantially equal to the pressure of said compressed air.

8. In an internal combustion engine, a fuel injection arrangement as set forth in claim 7, the adjustable throttle being provided in the return line.

9. In an internal combustion engine, a fuel injection arrangement as set forth in claim 7, a regulating means for the adjustable throttle adapted to be operated in response to air charge delivered to the engine per engine revolution.

10. In an internal combustion engine, a fuel injection arrangement as set forth in claim 7, the adjustable throttle having a port and control slide, the slide being adjustable in relation to the port and covering the latter more or less, said port having a width which increases with the square of the distance in the direction of the relative motion, and a controlling device adapted to control the adjustment of the port relative to the control slide in proportion to the air charge delivered to the engine per engine revolution.

11. In an internal combustion engine, a fuel injection arrangement as set forth in claim 7, said pressure control device in the return line comprising an adjustable throttle in the return line, a pressure-controlled means connected with the throttle which in turn controls said throttle, said member being subjected on the one hand to the pressure in the return line and on the other to a back pressure approximately equal to the pressure in the injection line.

12. In an internal combustion engine, a fuel injection arrangement consisting of an intake line for the air charge, a throttling means in the intake line, an injector-type atomizing nozzle entering said intake line, said nozzle having a fuel injection nozzle entering that atomizing nozzle back of the tapering front portion, a pressure-type fuel pump, a line connecting the fuel pump with the injection nozzle, a return line branching off from the latter adapted to return the fuel delivered in excess, a throttle in one of these two lines having a controlling device adapted for controlling the throttling action in accordance with the pressure on the engine side of the throttling means in the intake line, and a pressure controlling device for the return flow arranged on the engine side of said throttle, said pressure controlling device being adapted to be influenced by the back pressure at the injection nozzle in such a way that the back pressure in the return line opposing the pumping action is approximately equal to the back pressure at the injection nozzle opposing the pumping action.

13. In an internal combustion engine, a fuel injection arrangement as set forth in claim 12, said pressure controlling device comprising an additional adjustable throttle and a pressure-controlled means regulating said throttle, which is on the one hand subjected to the pressure in the return line and on the other to the pressure at the injector-type atomizing nozzle.

14. In an internal combustion engine, a fuel injection arrangement according to claim 4, the feeding and control device comprising a feed pump adapted to be driven by the engine with substantially continuous delivery, said pump having an effective plunger displacement approximately varying with a given engine speed in proportion with the volume of the air charge delivered to the engine per engine revolution.

15. In an internal combustion engine, a fuel injection arrangement as set forth in claim 4, the feeding and control device comprising a feed pump driven at engine speed, said feed pump having a stroke approximately varying in proportion with the volume of the air charge delivered per engine revolution.

16. In an internal combustion engine, a fuel injection arrangement comprising an injection device adapted for injecting the fuel into the air passing to the engine, a pump adapted for delivering fuel under pressure to the injecting device at a substantially continuous rate, the pump being of the rotary type with rotating plungers, the stroke of said plungers being adjustable, a movable element associated with said pump and adapted to adjust the stroke of said plungers, and means responsive to a change of the air charge delivered to the engine per revolution and co-operatively connected with said element.

17. In an internal combustion engine, a fuel injection arrangement according to claim 16, the pump comprising a pump housing with a cylinder-shaped pumping space, a partitioning member separating the pumping space into at least one pressure compartment and one suction compartment, the housing rotating in relation to said partitioning member substantially radially disposed, cylindrical spaces in this housing, plungers in these cylindrical spaces, and a controlling ring for controlling the plungers, the controlling ring being ordinarily non-rotatable in relation to the partitioning member, the eccentric position of said controlling ring being adjustable in relation to the pumping space, said means responsive to a change of the air charge being co-operatively connected with said controlling ring.

18. In an internal combustion engine, a fuel injection arrangement as set forth in claim 4, the feeding and controlling device consisting of a pump with substantially continuous delivery, the pump having a reduction gearing arranged between engine and pump and being of the type permitting of a continuous change of its ratio of transmission, and means responsive to a change of the pressure of the air charge co-operatively connected with said reduction gearing for the change of its ratio of transmission.

19. In an internal combustion engine, a fuel injection arrangement consisting of an injection device for injecting fuel into the air charge, an engine-driven injection pump adapted to set the fuel under pressure, an adjustable reduction gearing in the power transmission between engine and pump, and a control element associated with said gearing and adapted to change the ratio of transmission thereof.

20. In an internal combustion engine, a fuel injection arrangement as set forth in claim 19, the pump having a substantially continuous delivery.

21. In an internal combustion engine, a fuel injection arrangement as set forth in claim 19, the reduction gearing being of the type being adjustable for a continuous change of its ratio of transmission.

22. In an internal combustion engine, a fuel injection arrangement as set forth in claim 19, the reduction gearing being of the type including frictional elements settable for a continuous change of its ratio of transmission.

23. In an internal combustion engine, a fuel injection arrangement as set forth in claim 19, the reduction gearing being of the stepless two-stage friction type.

24. In an internal combustion engine, a fuel injection arrangement as set forth in claim 19, the reduction gearing being of the friction type consisting of a disk-wheel adapted to be driven by the engine, an axially adjustable roller adapted to roll on the disk-wheel and rotate on a crosswise arranged shaft, and an additional disk-wheel adapted to drive the pump, said additional disk-wheel having a shaft which is offset a certain distance as compared to the first disk-wheel and bearing on the friction roller, whereby the latter drives said additional wheel at a reduced speed as compared to the first wheel, the reduction in speed varying in accordance with the axial adjustment of the friction roller, said axially adjustable roller being connected with said control element for adjustment thereby.

25. In an internal combustion engine, a fuel injection arrangement comprising an injection device for injecting fuel into the air charge, an injection pump adapted to be driven by the engine and to exert a pressure on the fuel, and a friction-type gearing in the power transmission from engine to injection pump, the friction gearing comprising a disk-wheel adapted to be driven by the engine, another disk-wheel adapted to drive the pump substantially parallel disposed to the first and offset a certain distance, an axially adjustable friction roller between the two disk-wheels, said friction roller rotating on an axis substantially at right angles to the axis of the disk-wheels, resilient means adapted to press the disk wheels against the intermediate friction roller from opposite sides, means responsive to a change of the quantity of air delivered to the engine per revolution thereof, and a co-operative connection between such means and said friction roller for axial adjustment thereof.

26. In an internal combustion engine, a fuel injection arrangement as set forth in claim 19, the reduction gearing being of the friction-type comprising a disk-wheel adapted to be driven by the engine, an axially adjustable friction roller rolling on the wheel about a crosswise arranged axle, and an additional disk-wheel adapted to drive the pump, said disk-wheel having an axis offset at a certain distance from the first wheel and bearing on the friction roller, whereby the second wheel is driven by the friction roller at a reduced speed as compared with the first wheel, the speed reduction being changed in accordance with axial adjustment of the friction roller, and the maximum and minimum rolling radii of the friction roller on the two disk-wheels being substantially of equal size, said control element being co-operatively connected with said adjustable friction roller for axial adjustment thereof.

27. In an internal combustion engine, a fuel injection arrangement as set forth in claim 19, an additional reduction gearing being arranged between the engine and the driving member of the adjustable reduction gearing.

References Cited in the file of this patent

UNITED STATES PATENTS

| Number | Name | Date |
|---|---|---|
| 1,662,040 | Lee | Mar. 6, 1928 |
| 1,802,848 | Summers | Apr. 28, 1931 |
| 2,136,959 | Winfield | Nov. 15, 1938 |